United States Patent [19]

Denison et al.

[11] 4,101,874

[45] Jul. 18, 1978

[54] FLUID FLOW INDICATOR AND FLOW SWITCH

[75] Inventors: Dean R. Denison, Los Gatos; George J. Kren, Los Altos, both of Calif.

[73] Assignee: The Perkin-Elmer Corporation, Norwalk, Conn.

[21] Appl. No.: 709,947

[22] Filed: Jul. 29, 1976

[51] Int. Cl.² .................... G08B 21/00; G01F 1/06
[52] U.S. Cl. .................... 340/606; 73/231 R; 116/117 C; 340/608
[58] Field of Search ............ 340/239 R, 243; 73/229, 73/231; 116/117 C, 117 R

[56] References Cited

U.S. PATENT DOCUMENTS

| 2,097,535 | 11/1937 | Rugel et al. | 116/117 R |
| 2,687,457 | 8/1954 | Smith | 340/239 R X |
| 3,093,973 | 6/1963 | Williams | 73/229 X |
| 3,533,285 | 10/1970 | Dee | 73/231 M |
| 3,636,767 | 1/1972 | Duffy | 73/229 |
| 3,641,819 | 2/1972 | Kendrick | 73/229 |
| 3,783,248 | 1/1974 | Sugden, Jr. | 73/229 X |
| 3,866,469 | 2/1975 | Wemyss | 73/229 |
| 3,978,462 | 8/1976 | Goodman | 340/243 |

FOREIGN PATENT DOCUMENTS

752,496 7/1956 United Kingdom ............ 73/231 R

*Primary Examiner*—John W. Caldwell, Sr.
*Assistant Examiner*—Daniel Myer
*Attorney, Agent, or Firm*—Salvatore A. Giarrantana; Francis L. Masselle; Edwin T. Grimes

[57] ABSTRACT

A small diameter transparent visible fluid flow indicator suitable for mounting behind an opening in an instrument panel contains a six-bladed paddle wheel pivoted for rotation by the flow of fluid passing through orifices in the indicator housing. Each of the six blades of the wheel contains a small magnet oppositely polarized from the magnets in the adjacent blades to create alternate magnetic fields that pass through a pickup coil embedded in the housing. The resulting coil voltage is amplified and rectified to control a relay switch. Thus, the liquid flow indicator provides both a visible indication of fluid flow and also controls a switching circuit that may be used as an alarm if the fluid flow stops or varies from some predetermined value.

5 Claims, 4 Drawing Figures

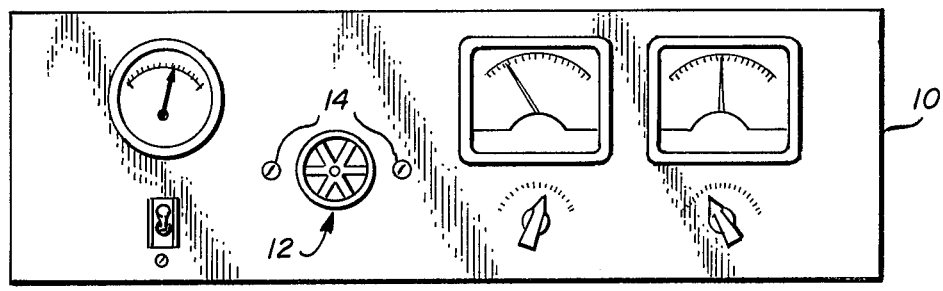
Fig_1
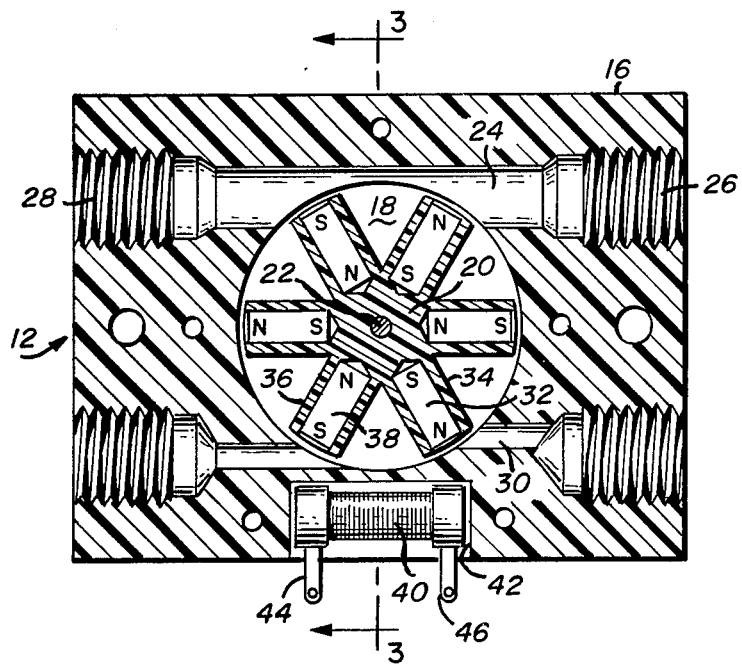
Fig_2
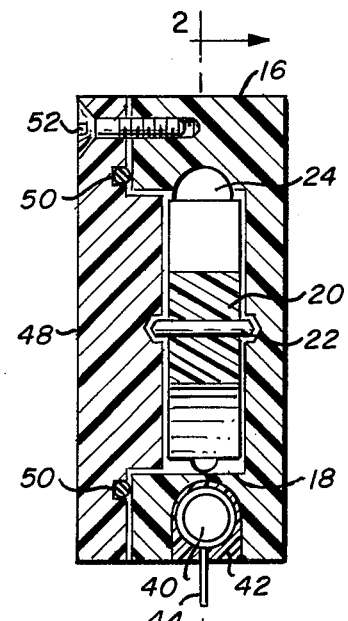
Fig_3
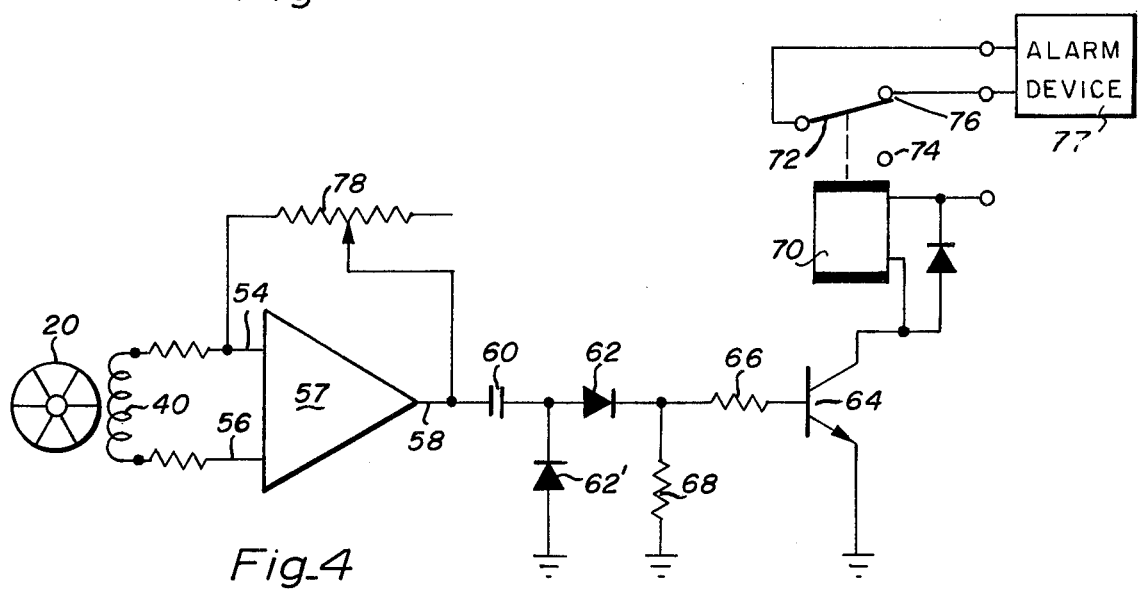
Fig_4

FLUID FLOW INDICATOR AND FLOW SWITCH

BACKGROUND OF THE INVENTION

Many types of equipment, particularly those associated with the electronic art, often require a relatively small flow of cooling water to prevent over-heating of delicate and costly components. For example, the large vacuum tubes used by high-power radio transmitters require cooling, which is usually by a flow of water through cooling coils surrounding the tube envelope. If the flow of water accidentally stops, there would be serious over-heating problems and possible damage to the equipment. Similarly, a flow of cooling water is often necessary to cool components being subjected to electron bombardment or sputtering in vacuum deposition equipment to prevent melting or other costly damage to the various components and materials.

There are many types of flow indicators available, most of which indicate the quantity of flow through the system. The present invention comprises a small transparent fluid flow indicator particularly suitable for mounting behind a circular hole in an instrument panel, such as is used to mount controls, gauges and meters associated with the vacuum deposition system. The indicator includes a small paddle wheel which is very readily visible through the transparent cover of the indicator and the rotation which will indicate the approximate fluid flow to the equipment operator. The paddle wheel has six blades, each containing a small bar magnet so that rotation of the paddle wheel will generate an alternating magnetic field that is sensed by a pickup coil in the indicator housing adjacent to the paddle wheel. The output of the coil may then be amplified and applied to a relay circuit that will be actuated by the fluid flow and generation of the magnetic field and which may be used to sound an alarm if the fluid is prevented from flowing through the indicator.

In the drawings that illustrate a preferred embodiment of the invention:

FIG. 1 is an illustration of a typical vacuum pump control panel containing the fluid flow indicator of the invention;

FIG. 2 is a sectional elevation view of the indicator showing the location of the various components;

FIG. 3 is a sectional side elevation view taken along the lines 3—3 of FIG. 2; and FIG. 4 is an electrical schematic diagram of the preferred embodiment of the fluid flow switch circuit of the invention.

Turning now to a detailed description of the invention, FIG. 1 is an elevation view illustrating a typical vacuum pump control panel containing an assortment of meters and controls and also including the fluid flow indicator 12 of the invention. Normally, the indicator 12 would be mounted by suitable mounting screws 14 behind a circular hole in the panel 10. Then, as will be subsequently described, a flow of fluid through the indicator will cause rotation of the indicator paddle wheel at a speed approximately proportional to the rate of flow of the fluid. Because the indicator has a transparent front face, this rotation is easily observed and may be made more obvious, if desired, by making one blade of the paddle wheel a distinctive color in contrast to the color of the remaining arms.

FIG. 2 is a sectional elevation view of the indicator assembly 12 and shows a rectangular indicator housing 16 containing a centrally located circular aperture 18 in which is placed a paddle wheel turbine 20 which is mounted for rotation within aperture 18 on a shaft 22. As will be subsequently explained, the turbine 20 has an even number of blades and in the preferred embodiment, it is provided with six blades.

In the embodiment illustrated, the indicator housing 16 is approximately three inches long, approximately two and one-quarter inches high, and approximately three-quarters of an inch in thickness as illustrated in FIG. 3. The housing may be constructed of any suitable material capable of withstanding the pressure of the fluid and of resisting any corrosion that may be caused by the fluid. Similarly, the turbine 20 may be constructed of any suitable material, preferably a plastic, and the shaft 22 is preferably a stainless steel pin approximately one-eighth inch in diameter.

Extending longitudinally through housing 16 and opening into the circular aperture 18 is a tubular channel 24 which has a diameter of approximately one-third of an inch. Each end of the tubular channel preferably terminates in holes 26 and 28 which are threaded to receive one-quarter inch pipes which carry the fluid through the indicator housing 16 to force rotation of the turbine 20.

With the diameter channel 24 being approximately one-third inch, it will accommodate a fluid flow at a rate of between approximately one and ten gallons per minute. When it is desired to use the indicator with a smaller flow of fluid, the fluid should pass through a smaller channel, such as the channel 30 which has a diameter of approximately 0.09 inch. A channel of this diameter will properly operate the indicator 12 at fluid flows of between 0.1 and 1.0 gallon per minute. In the preferred embodiment illustrated in FIGS. 2 and 3, both size channels are in the housing 16. In use, the operator will seal the unused channel with an appropriate pipe plug.

Each of the six blades of the turbine 20 has a sufficiently large cross-sectional dimension to permit the drilling of a longitudinal hole into the outer periphery and press fitting therein of a small bar magnet having a diameter of approximately one-eighth inch and a length of approximately one-half inch. The magnet 32 is arranged with its north pole near the outer periphery of the turbine blade 34. The adjacent turbine blade 36 is provided with a magnet 38 which is polarized with its south pole at the outer periphery of the blade 36. Each magnet is, therefore, mounted within the turbine blade, so that the outer periphery of adjacent blades contain magnets of opposite polarity. It is apparent, therefore, that an even number of blades is required so that opposing magnetic fields will be set up between the poles in the outer peripheries of adjacent turbine blades and that a rotation of the turbine 20 will produce alternating magnetic flux fields near the outer periphery of the rotating turbine. To sense this alternating magnetic field, an inductive pickup coil 40 is placed within an aperture 42 in the indicator housing 16. The coil 40 is sealed within the aperture 42 by a suitable potting compound, leaving exposed only the coil terminals 44 and 46.

FIG. 3 is a sectional side elevation view taken along the lines 3—3 of FIG. 2 and illustrates the placement of the turbine 20 on its shaft 22 within the channel 24. When the indicator is assembled, the shaft 22 extends within a small hole in the transparent base plate 48, which is rigidly sealed and clamped to the housing 16 by a suitable O-ring 50 and screws 52.

FIG. 4 is a schematic diagram illustrating a preferred embodiment of the circuitry which senses the rotation of the turbine 20 and provides relay contacts for an alarm to be actuated whenever the turbine 20 ceases its rotation. In FIG. 4, the alternating magnetic field caused by the rotation of the turbine 20 is sensed by the pickup coil 40, the terminals of which are connected to the inverting input terminal 54 and the non-inverting terminal 56 of an operational amplifier 57. The output terminal 58 of operational amplifier 57 is coupled through a capacitance 60 to ground by a diode 64' and to a rectifying diode 62 which converts the alternating signal received from the coil 40 into a corresponding direct current signal. This direct current signal is then applied to the base of a transistor 64 which is suitably biased by resistors 66 and 68 so that, in the absence of an input signal from coil 40, the transistor 64 will be sufficiently non-conductive that it will not pass an energizing current through the current relay coil 70 that is coupled between the collector of transistor 64 and a positive source of collector current. Relay coil 70 actuates relay contacts so that a flow of current through the transistor 64 will cause the relay armature 72 to move into contact with its normally open contact 74. Conversely, when turbine 20 is rotated too slowly or is stopped, an insufficient signal is picked up by the coil 40 to produce an energizing current flow through transistor 64 and the relay armature 72 drops back to its normally closed contact 76 to which may be connected a suitable alarm system 77.

In order to adjust the circuit to accommodate various threshholds at which the relay coil 70 will release the armature 72, a variable feedback resistor 78 is coupled between the output terminal 58 and the inverting input terminal 54 of the operational amplifier 57. In operation, therefore, the operator may adjust the water flow to its optimum rate and then adjust resistance 78 to the point where sufficient current flows through transistor 64 and the relay coil 70 to disconnect the relay armature 72 from the terminal 76. Then, any reduction in fluid flow will release the armature 72 to make contact with the terminal 76 and sound the alarm. The system is thus fail safe: any failure of fluid flow, any accidental jamming of the turbine, or failure of the electrical circuit components will result in the release of the relay armature 72 and the energization of the alarm.

What is claimed is:

1. A fluid flow indicator comprising:
   a housing having at least one planar surface having a circular aperture therein, the plane of the circle of said aperture being coplanar with said planar surface; said housing containing a plurality of fluid channels entering and exiting said circular aperture, each of said plurality having a different fluid carrying capacity, said channels entering or exiting said circular aperture substantially along a tangent to the periphery of said aperture;
   an aperture cover plate having at least one planar surface adapted to cover and seal said circular aperture;
   a turbine mounted for rotation within said circular aperture, said turbine having an even number of radially positioned blades, each blade having a bar magnet embedded therein with one pole of said magnet being located adjacent the outer end of said blade, the polarity of said one pole being opposite to the polarity of the magnetic poles in the outer ends of the adjacent blades.

2. The indicator claimed in claim 4 further including electrical alarm circuirty coupled to said pickup coil, said circuitry including relay means energized by the electrical signal generated by rotation of said turbine by the flow of a fluid through one of said channels.

3. The indicator claimed in claim 2 wherein said circuitry includes a threshhold adjusting means for adjusting the circuitry to de-energize said relay at a predetermined electrical input signal level.

4. A fluid flow indicator comprising:
   a housing having at least one planar surface having a circular aperture therein, the plane of the circle of said aperture being coplanar with said planar surface;
   an aperture cover plate having at least one planar surface adapted to cover and seal said circular aperture;
   a turbine mounted for rotation within said circular aperture, said turbine having means for producing an even plurality of magnetic poles at the periphery of said turbine, each magnetic pole having a polarity opposite to that of its adjacent poles;
   a pickup coil mounted within the magnetic field of said magnetic poles; and
   said housing containing a plurality of fluid channels entering and exiting said circular aperture, each of said plurality having a different fluid carrying capacity.

5. The indicator claimed in claim 4 wherein said aperture cover plate has a transparent section through which at least a portion of said aperture may be viewed.

* * * * *